Patented Apr. 17, 1934

1,954,909

UNITED STATES PATENT OFFICE 1,954,909

PROCESSES FOR THE PRODUCING OF MOLECULAR COMPOUNDS OF THE SALTS OF PHENYL - QUINOLINE CARBOXYLIC ACIDS WITH ALKYLATED PYRAZOLONES AND ALKYLATED AMINO-PYRAZOLONES

Oscar Adler and Rudolf Adler, Karlsbad, Czechoslovakia

No Drawing. Application October 24, 1930, Serial No. 491,080. In Czechoslovakia November 14, 1929

13 Claims. (Cl. 260—39)

The present invention relates to a process for producing molecular compounds of the salts of phenyl-quinoline carboxylic acids with alkylated pyrazolones and amino-pyrazolones.

It consists in this that the said compounds in a quantity corresponding to the molecular ratio each time coming into question are heated in presence of water at a temperature necessary for producing a perfectly clear melt.

When working in this way it sometimes happens that complete solidification of the reaction product does not take place. This disadvantage may be removed if the hot reaction product is first of all subjected to a gradual cooling within a temperature interval lying 5 to 50° below the solidification point of the molecular compound.

In the following table some of the molecular compounds which can be obtained by the process described above are given and the necessary fusion temperatures and solidification points are stated:

| Molecular compound | Fusion temperature in degrees C. | Solidification point in degrees C. |
|---|---|---|
| $NaC_{16}H_{10}O_2N.C_{13}H_{17}ON_3$ | 110 | 80 |
| $NaC_{16}H_{10}O_2N.2C_{13}H_{17}ON_3$ | 110 | 75 |
| $LiC_{16}H_{10}O_2N.C_{13}H_{17}ON_3$ | 140 | 90 |
| $LiC_{16}H_{10}O_2N.2C_{13}H_{17}ON_3$ | 120 | 70 |
| $CaC_{16}H_{10}O_2N_2.2C_{13}H_{17}ON_3$ | 116 | 80 |
| $CaC_{16}H_{10}O_2N_2.4C_{13}H_{17}ON_3$ | 110 | 70 |
| $SrC_{16}H_{10}O_2N_2.2C_{13}H_{17}ON_3$ | 140 | 95 |
| $SrC_{16}H_{10}O_2N_2.4C_{13}H_{17}ON_3$ | 135 | 80 |
| $MgC_{16}H_{10}O_2N_2.2C_{13}H_{17}ON_3$ | 130 | 95 |
| $MgC_{16}H_{10}O_2N_2.4C_{13}H_{17}ON_3$ | 120 | 65 |
| $NaC_{16}H_{10}O_2N.C_{11}H_{12}ON_2$ | 120 | 75 |
| $NaC_{16}H_{10}O_2N.2C_{11}H_{12}ON_2$ | 115 | 65 |
| $LiC_{16}H_{10}O_2N.C_{11}H_{12}ON_2$ | 130 | 80 |
| $LiC_{16}H_{10}O_2N.2C_{11}H_{12}ON_2$ | 125 | 70 |
| $CaC_{16}H_{10}O_2N_2.2C_{11}H_{12}ON_2$ | 150 | 100 |
| $CaC_{16}H_{10}O_2N_2.4C_{11}H_{12}ON_2$ | 130 | 90 |
| $SrC_{16}H_{10}O_2N_2.2C_{11}H_{12}ON_2$ | 185 | 115 |
| $SrC_{16}H_{10}O_2N_2.4C_{11}H_{12}ON_2$ | 120 | 80 |
| $MgC_{16}H_{10}O_2N_2.2C_{11}H_{12}ON_2$ | 135 | 95 |
| $MgC_{16}H_{10}O_2N_2.4C_{11}H_{12}ON_2$ | 125 | 75 |

The graphic formulæ of the following compounds $C_{13}H_{17}ON_3$ and $C_{11}H_{12}ON_2$ are:

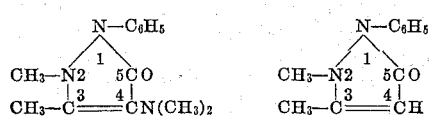

For the purpose of explaining the process a specific example of the manner of carrying out the same may be given which may also be employed in an analogous manner for the other molecular compounds coming into question.

*Example*

25 g of the calcium salt of 2-phenyl-4-quinoline carboxylic acid are ground in a mortar with 21.56 g of 1-phenyl-2, 3-dimethyl-4-dimethyl-amino-5-pyrazolone with addition of 10 cm³ of water. The mixture so obtained is heated to a temperature of 110° and is thoroughly stirred at the expiry of each 10-15 minutes. The reaction process is completed when a perfectly clear melt is formed in which no unchanged particles of the reaction components can be seen and in which there is no perceptible ascension of steam bubbles. This state is attained when using the said quantities in 2-2½ hours. The melt is allowed to cool and then it is pulverized in the usual manner.

The molecular compounds produced according to the foregoing process show a quite different behaviour as compared with the initial substances.

Whereas the alkaline earth salts and the magnesium salt of 2-phenyl-quinoline-4-carboxylic acid are slightly soluble or insoluble in water, the molecular compounds described turn out to be extraordinarily easily soluble in water. The compounds prepared from the sodium and lithium salt of 2-phenyl-quinoline-4-carboxylic acid and the said pyrazolone derivatives form stable solutions with cold or hot water in any proportions: the molecular compounds which are obtained from the alkaline earth salts and the magnesium salts of 2-phenyl-quinoline-4-carboxylic acid yield solutions having a content of 1.5-6%.

Particularly noteworthy is the behaviour of the molecular compounds described above towards dilute hydrochloric acid. The salts of 2-phenyl-quinoline-4-carboxylic acid are readily decomposed by hydro-chloric acid and the free acid, which is almost insoluble in water, is separated out. The aforesaid molecular compounds on the other hand are somewhat resistant towards hydro-chloric-acid; the aqueous solutions of the molecular compounds prepared from one molecule of the alkali salts of 2-phenyl-quinoline-4-carboxylic acid and from two molecules of the said pyrazolone derivatives, as well as the molecular compounds made from one molecule of the alkaline earth and magnesium salts of phenyl quinoline carboxylic acid and four molecules of the said pyrazolone derivatives, are not precipitated by N/10 hydrochloric acid, even added in great excess, and form clear stable solutions; the remaining molecular compounds of these described above decompose under this treatment quite slowly, after long keeping. The molecular compounds prepared according to the present process possess great stability when the same are dissolved in genuine gastric juice. The described properties are also maintained if one of the reaction components is used in a certain excess which does not exceed a definite amount.

The molecular compounds described above are used as curative agents and have proved themselves to be particularly suitable in cases of true gout with inflammatory joint manifestations, uratic diathesis, chronic joint disorders or chronic arthritis when administered through the mouth with 3-4 doses of 0.5-0.6 g per day. In certain cases subcutaneous or intramuscular injection of the sterile solution of the sodium salt of the compounds described above has been found to be very favorable. In special cases the compounds mentioned above may also be used as salves or in the form of suppositories.

What we claim is:

1. A process for producing double compounds of salts of phenylquinoline carboxylic acids with a pyrazolone of the group consisting of methylated pyrazolone and methylated amino-pyrazolone, consisting in heating a mixture containing an alkali forming metal phenylquinoline carboxylate and the pyrazolone for forming the double compound with the reaction components in the molecular ratio of 1:1 to 1:2 in the presence of water until a clear melt is obtained, and then allowing the mass to cool.

2. A process for producing double compounds of salts of phenylquinoline carboxylic acids with a pyrazolone of the group consisting of methylated pyrazolone and methylated amino-pyrazolone, consisting in heating a mixture containing an alkali metal salt of a phenylquinoline carboxylic acid and the pyrazolone for forming the double compound with the reaction components in the molecular ratio 1:1 to 1:2 in the presence of water until a clear melt is obtained, and then allowing the mass to cool.

3. A process for producing double compounds of salts of phenylquinoline carboxylic acids with a pyrazolone of the group consisting of methylated pyrazolone and methylated amino-pyrazolone, comprising heating a mixture containing an alkali forming metal phenylquinoline carboxylate and the pyrazolone for forming the double compound with the reaction components in the molecular ratio 1:1 to 1:2 in the presence of water until a clear melt is obtained.

4. A process for producing a double salt of phenylquinoline carboxylic acid and methylated amino-pyrazolones consisting in mixing 25 g of the calcium salt of 2-phenyl-4-quinoline carboxylic acid with 21.56 g of 1-phenyl-2,3-dimethyl-4-dimethyl-amino-5-pyrazolone, adding 10 cc. of water, heating at 110° until a perfectly clear melt is obtained, and then cooling.

5. A process for producing double compounds of salts of phenylquinoline carboxylic acids with methylated pyrazolone, consisting in heating a mixture containing an alkali forming metal of phenylquinoline carboxylate and methylated pyrazolone for forming the double compound with the reaction components in the molecular ratio 1:1 in the presence of water until a clear melt is obtained, and then allowing the mass to cool.

6. A process for producing double compounds of salts of phenylquinoline carboxylic acids with methylated pyrazolone, consisting in heating a mixture containing an alkali forming metal of phenylquinoline carboxylate and methylated pyrazolone for forming the double compound with the reaction components in the molecular ratio 1:2 in the presence of water until a clear melt is obtained, and then allowing the mass to cool.

7. A process for producing double compounds of salts of phenylquinoline carboxylic acids with methylated amino-pyrazolone, consisting in heating a mixture containing an alkali forming metal of phenylquinoline carboxylate and methylated amino-pyrazolone for forming the double compound with the reaction components in the molecular ratio 1:1 in the presence of water until a clear melt is obtained, and then allowing the mass to cool.

8. A process for producing double compounds of salts of phenylquinoline carboxylic acids with methylated amino-pyrazolone, consisting in heating a mixture containing alkali metal salt of a phenylquinoline carboxylic acid and methylated amino-pyrazolone for forming a double compound with the reaction components in the molecular ratio of 1:1 in the presence of water until a clear melt is obtained, and then allowing the mass to cool.

9. A process for producing double compounds of salts of phenylquinoline carboxylic acids with methylated pyrazolone, consisting in heating a mixture containing alkali metal salt of phenylquinoline carboxylic acid and methylated pyrazolone for forming a double compound with the reaction components in the molecular ratio of 1:1 in the presence of water until a clear melt is obtained, and then allowing the mass to cool.

10. A process for producing double compounds of salts of phenylquinoline carboxylic acids with methylated pyrazolone, consisting in heating a mixture containing alkali metal salt of a phenylquinoline carboxylic acid and methylated pyrazolone for forming a double compound with the reaction components in the molecular ratio of 1:2 in the presence of water until a clear melt is obtained, and then allowing the mass to cool.

11. A process for producing double compounds of salts of phenylquinoline carboxylic acids with methylated pyrazolone, comprising heating a mixture containing an alkali forming metal of phenylquinoline carboxylate and methylated pyrazolone for forming the double compound with the reaction components in the molecular ratio 1:1 in the presence of water until a clear melt is obtained.

12. A process for producing double compounds of salts of phenylquinoline carboxylic acids with methylated pyrazolone, comprising heating a mixture containing an alkali forming metal of phenylquinoline carboxylate and methylated pyrazolone for forming the double compound with the reaction components in the molecular ratio 1:2 in the presence of water until a clear melt is obtained.

13. A process for producing double compounds of salts of phenylquinoline carboxylic acids with methylated amino-pyrazolone, comprising heating a mixture containing an alkali forming metal of phenylquinoline carboxylate and methylated amino-pyrazolone for forming the double compound with the reaction components in the molecular ratio 1:1 in the presence of water until a clear melt is obtained.

OSCAR ADLER.
RUDOLF ADLER.